US006456753B1

(12) United States Patent
Gee et al.

(10) Patent No.: US 6,456,753 B1
(45) Date of Patent: Sep. 24, 2002

(54) OPTICAL SWITCHING APPARATUS

(75) Inventors: Dale A. Gee, Los Gatos; Madhav Y. Reddy, Cupertino; Sascha Hallstein, San Jose, all of CA (US); Dilip K. Paul, Bethesda, MD (US); Vipul D. Badoni; David M. Hong, both of San Jose, CA (US)

(73) Assignee: Nayna Networks, Milpitas, CA (US)

( * ) Notice: Subject to any disclaimer, the term of this patent is extended or adjusted under 35 U.S.C. 154(b) by 11 days.

(21) Appl. No.: 09/611,425

(22) Filed: Jul. 7, 2000

(51) Int. Cl.[7] .............................. G02B 6/26; G02B 6/42
(52) U.S. Cl. ........................................... 385/18; 385/17
(58) Field of Search .............................. 385/16, 17, 18; 359/223, 224

(56) References Cited

U.S. PATENT DOCUMENTS 6,253,001 B1 * 6/2001 Hoen ........................... 385/17

* cited by examiner

Primary Examiner—Cassandra Spyrou
Assistant Examiner—Alessandro V. Amari
(74) Attorney, Agent, or Firm—Townsend & Townsend & Crew LLP

(57) ABSTRACT

An apparatus for switching one of a plurality of optical signals from a plurality of optical fibers. The apparatus has an input fiber bundle housing comprising an outer side and an inner side. The input fiber bundle housing has a plurality of sites oriented in a spatial manner on the outer side for coupling to a plurality of input optical fibers. Each of the input optical fibers is capable of transmitting an optical signal. The apparatus also has a first mirror array disposed facing the inner side of the input fiber bundle housing. The first mirror array includes a plurality of mirrors. Each of the mirrors corresponds to one of the sites on the outer side of the input fiber bundle housing. A second mirror array is disposed facing the first mirror array. The second mirror array is also disposed around a periphery of the input fiber bundle. The second mirror array also has a plurality of mirrors, where each of the mirrors is capable of directing at least one signal from one of the mirrors on the first mirror array. The apparatus has an output fiber bundle housing comprising an outer side and an inner side. The output fiber bundle housing has a plurality of sites oriented in a spatial manner on the outer side for coupling to a plurality of output optical fibers. Each of the sites is capable of receiving at least one signal from one of the second mirrors.

25 Claims, 6 Drawing Sheets

OPTICAL SWITCHING APPARATUS

BACKGROUND OF THE INVENTION

This invention generally relates to techniques for wide area networking. More particularly, the present invention provides an apparatus for switching a plurality of optical signals using a novel optical configuration. Merely by way of example, the present invention is implemented using such apparatus in a wide area network for long haul telecommunications, but it would be recognized that the invention has a much broader range of applicability. The invention can be applied to other types of networks including local area networks, enterprise networks, and the like.

Digital telephone has progressed with the need for faster communication networks. Conventionally, standard analog voice telephone signals have been converted into digital signals. These signals can be 64,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode fiber optics have also been used at much higher speeds of data transfer. Here, optical switching networks have also been improved. An example of such optical switching standard is called the Synchronous Optical Network (SONET), which is a switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices require the need to convert optical signals from a first source into electric signals for switching such optical signals over a communication network. Once the electric signals have been switched, they are converted back into optical signals for transmission over the network. As merely an example, a product called the SN 16000, BroadLeaf™ Network Operating System (NOS), made by Sycamore Networks, Inc. uses such electrical switching technique. Numerous limitations exist with such conventional electrical switching technique. For example, such electrical switching often requires a lot of complex electronic devices, which make the device difficult to scale. Additionally, such electronic devices become prone to failure, thereby influencing reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale and to build commercial devices. Other companies have also been attempting to develop technologies for switching high number of signals in other manners, but have been generally unsuccessful.

From the above, it is seen that an improved way to switching a plurality of optical signal is highly desirable.

SUMMARY OF THE INVENTION

According to the present invention, a technique including an apparatus for optical switching is provided. More particularly, the invention provides an apparatus having a novel mirror configuration for switching one or more optical signals from a plurality of optical fibers from an input source to one of a plurality of output fiber ports.

In a specific embodiment, the present invention provides an apparatus for switching at least one of a plurality of optical signals from a plurality of optical fibers. The apparatus has an input fiber bundle housing comprising an outer side and an inner side. The input fiber bundle housing has a plurality of sites oriented in a spatial manner on the outer side for coupling to a plurality of input optical fibers. Each of the input optical fibers is capable of transmitting an optical signal. The apparatus also has a first mirror array disposed facing the inner side of the input fiber bundle housing. The first mirror array includes a plurality of mirrors. Each of the mirrors corresponds to one of the sites on the outer side of the input fiber bundle housing. A second mirror array is disposed facing the first mirror array. The second mirror array is also disposed around a periphery of the input fiber bundle housing. The second mirror array also has a plurality of mirrors, where each of the mirrors is capable of directing at least one signal from one of the mirrors on the first mirror array. The apparatus has an output fiber bundle housing comprising an outer side and an inner side. The output fiber bundle housing has a plurality of sites oriented in a spatial manner on the outer side for coupling to a plurality of output optical fibers. Each of the sites is capable of receiving at least one signal from one of the second mirrors.

In an alternative embodiment, the apparatus has a novel switching apparatus. The apparatus switches one of a plurality of optical signals from a plurality of optical fibers. The apparatus has a top side comprising a top fiber bundle housing and a top mirror housing disposed around a periphery of the top fiber bundle housing. The apparatus also has a bottom side coupled to the top side. The bottom side is substantially facing the top side. The bottom side is a substantially parallel to the top side. The bottom side comprises a bottom mirror housing and a bottom fiber bundle housing disposed around a periphery of the bottom mirror housing.

Many benefits are achieved by way of the present invention over conventional techniques. In some embodiments, the invention provides a novel coaxial configuration where, for example, reflection angles are reduced, thereby providing for more effective switching of signals. The invention configuration with near normal angle of incidence reduces polarization induced losses in still further embodiments. In other embodiments, the invention provides for a more efficient and smaller form factor, which allows the apparatus to be implemented in smaller spatial regions. The invention can also provide a configuration for easier alignment between the fiber bundle and mirrors in some embodiments. Here, the novel coaxial configuration allows for easier assembly and alignment between the mirrors and fiber bundle. The invention can also provide a smaller spot size for the signal due to the near normal incident optical signal, thereby allowing one to use smaller mirrors than would be required in conventional techniques. This could result in larger port count switch versions as compared to conventional techniques. The invention also has a less demanding requirement for deflection of the mirrors in the array in other embodiments. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF THE SPECIFIC EMBODIMENTS

According to the present invention, a technique including an apparatus for optical switching is provided. More particularly, the invention provides an apparatus having a novel mirror configuration for switching one or more optical signals from a plurality of optical fibers from an input source to one of a plurality of output fibers at an output source.

Figure 1:
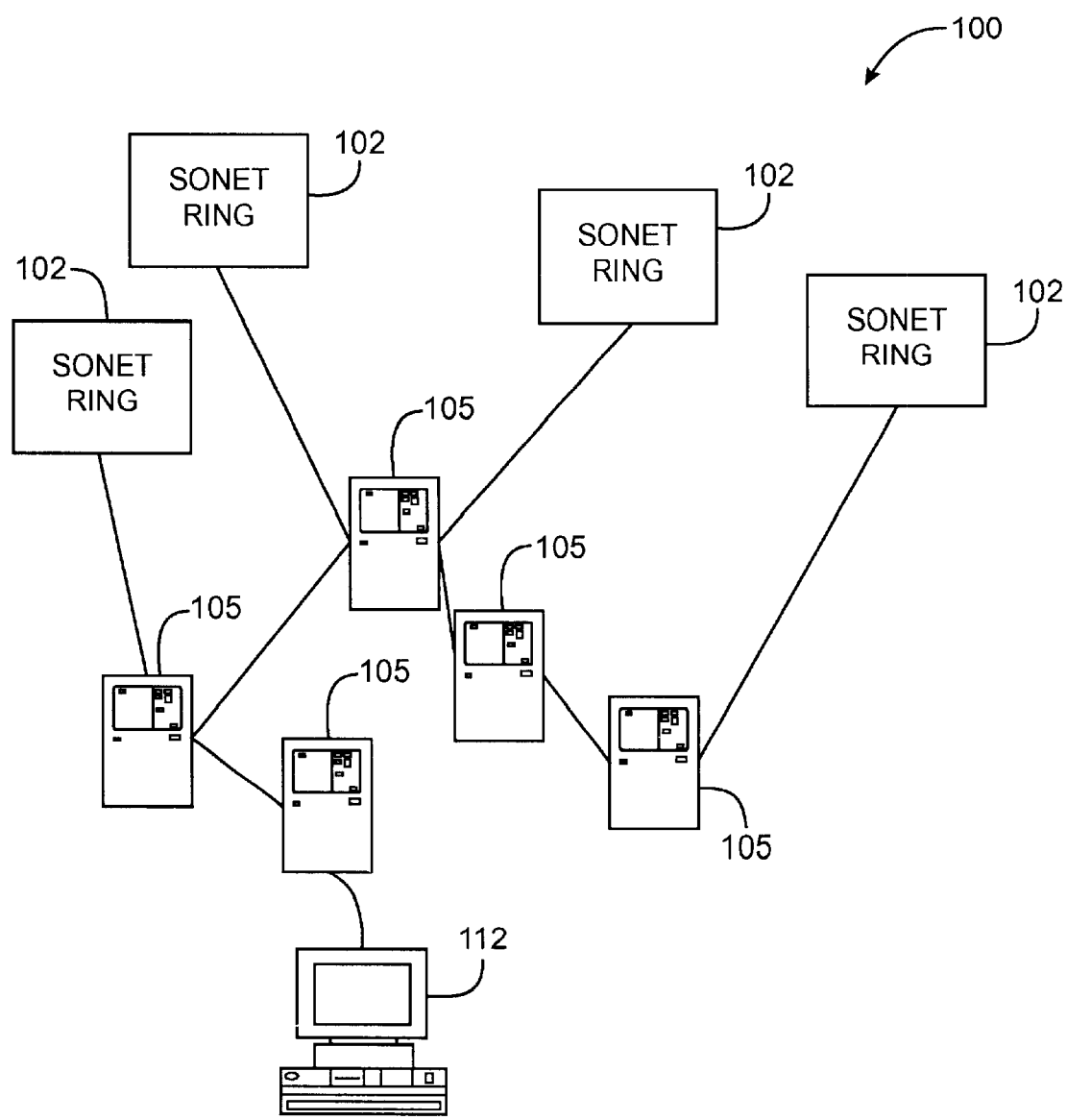
FIG. 1 is simplified diagram of an optical switching network according to an embodiment of the present invention.

FIG. 1 is simplified diagram 100 of a optical switching network according to an embodiment of the present invention. This diagram is merely an example, which should not unduly limit the scope of the claims herein. One of ordinary skill in the art would recognize many other variations, modifications, and alternatives. As shown, the diagram illustrates an optical network system 100 including a plurality of SONET rings 102. Each of the SONET rings is coupled to one or more network switching systems 105, which are coupled to each other. The network switching systems can be coupled to long haul optical network system. In a specific embodiment, each of the switching systems switches an optical signal from one of the rings to another one of the rings, where the transmission path is substantially optical. That is, the signal is not converted into an electrical signal via an optoelectronic device, which is coupled to an electrical switch that switches the signal. In the present embodiment, the transmission path is substantially optical. Further details of the switching system are provided below.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

Figure 2:
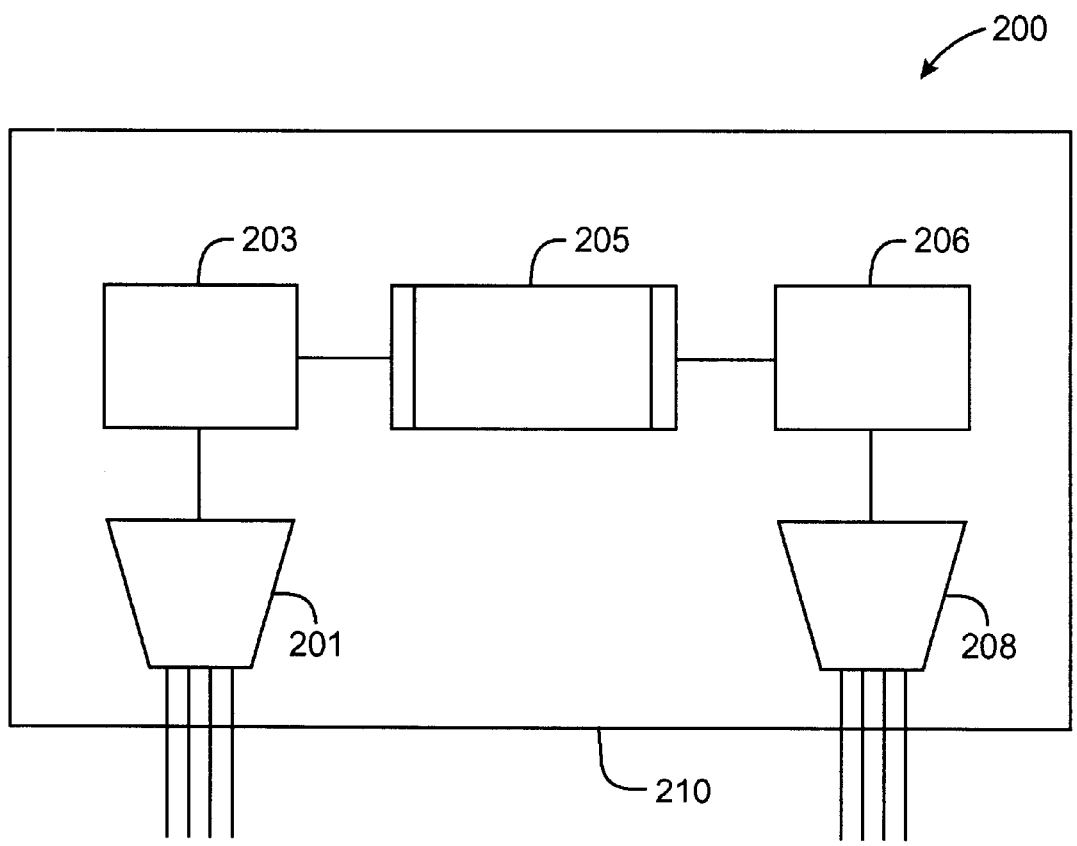
FIG. 2 is a simplified diagram of an optical switching apparatus according to an embodiment of the present invention.

FIG. 2 is a simplified diagram of an optical switching apparatus 200 according to an embodiment of the present invention. This diagram is merely an example, which should not unduly limit the scope of the claims herein. One of ordinary skill in the art would recognizes many other variations, modifications, and alternatives. As shown, the apparatus 200 includes a variety of features such as input source 201 (from fiber bundle) and output 208. The input source is coupled to housing including lens array 203. Lens array is coupled to mirror arrays 205. Further details of the mirror arrays are provided below. The mirror arrays are coupled to lens array 206, which couples to output fiber bundle 208.

As merely an example, the signal pathway traverses through the apparatus from input source 201 to output 208. Here, the signal pathway begins at the input source 201, which is from the fiber bundle. The signal traverses through a lens in the lens array 203, which focuses the signal. The signal traverses through the mirror arrays, which switch the signal between any one of a plurality of output fibers. The signal traverses from the mirror arrays to a lens, which is on lens array 206 to focus the signal. The signal is then output 208. Other steps can be performed depending upon the embodiment.

The present apparatus provides a pure optical pathway during switching in preferred embodiments. Preferably, the optical pathway is substantially free from any electrical switching of conventional devices. Other benefits would be recognized by one of ordinary skill in the art.

Additionally, the apparatus can become smaller in size using the novel configuration, and has a better form factor. In a specific embodiment, the apparatus has a small form factor. The form factor can be a few inches or less per side. In some embodiments, the apparatus is sealed using a non-reactive gas. The gas can be selected from any suitable compounds. For example, the gas can include nitrogen, argon, helium, and the like. The gas is preferably free from any oxygen bearing compounds, which can lead to oxidation. The sealed apparatus has a submicron (e.g., 0.5 or less) sized particle count of less than 10 ppm. The various features from input source 201 through output 208 are sealed from the environment.

The system also does not include electrical devices, which can be prone to error and the like. Since a lot of conventional electrical hardware has been eliminated, the present apparatus is reliable and is less prone to error. The apparatus also has a modular design, which can be easy to repair and/or replace. Here, a technician can easily remove the apparatus from the network and replace it with another apparatus. The overall system switching speed is 50 milliseconds or less in the apparatus for conventional networks, but can be much lower in other environments. In the present invention, the switching speed for the apparatus is 15 milliseconds or less or even 5 milliseconds or less. Preferably, the apparatus also conforms to Telecordia standards. There are many other benefits, which would be recognized by one of ordinary skill in the art.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

Figure 3:
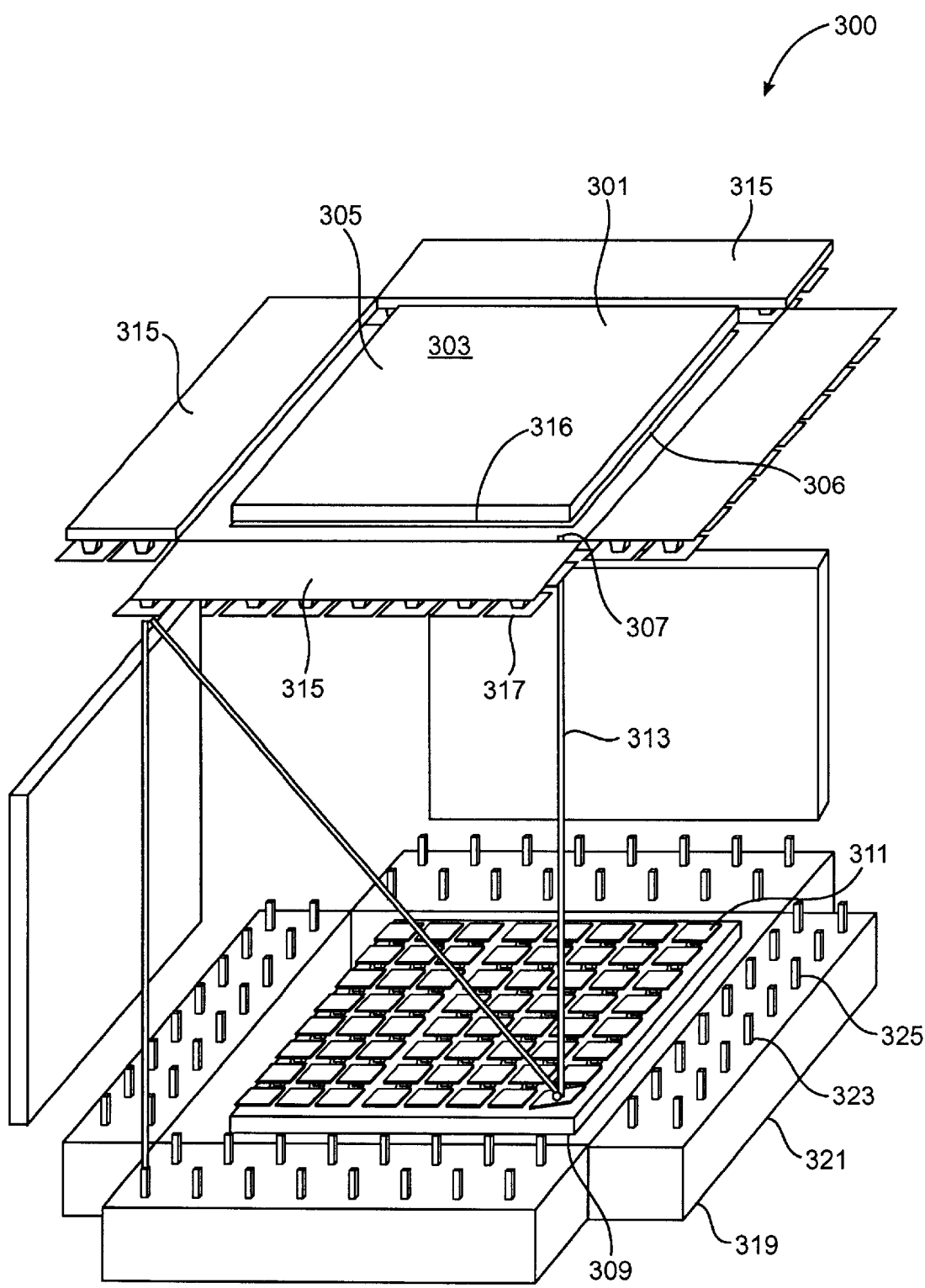
FIG. 3 is a simplified diagram of an optical switching device according to an embodiment of the present invention.

FIG. 3 is a simplified diagram of an optical switching device 300 according to an embodiment of the present invention. This diagram is merely an example, which should not unduly limit the scope of the claims herein. One of ordinary skill in the art would recognizes many other variations, modifications, and alternatives. As shown, the device 300 for switching one of a plurality of optical signals from a plurality of optical fibers 301 is provided. The device has an input fiber bundle housing 303 comprising an outer side 305 and an inner side 306. The input fiber bundle housing has a plurality of sites 307 oriented in a spatial manner on the outer side for coupling to a plurality of input optical fibers. Each of the input optical fibers is capable of transmitting an optical signal. Preferably, the signal is transmitted through a lens, which is described in more detail below. The apparatus also has a first mirror array 309 disposed facing the inner side of the input fiber bundle housing. The first mirror array 309 includes a plurality of mirrors 311. Each of the mirrors 311 corresponds to one 313 of the sites on the outer side of the input fiber bundle housing. A second mirror array 315 is disposed facing the first mirror array. The second mirror array is also disposed around a periphery 316 of the input fiber bundle housing. The second mirror array also has a plurality of mirrors 317, where each of the mirrors is capable of directing at least one signal from one of the mirrors on the first mirror array. The device has an output fiber bundle housing 319 comprising an outer side 321 and an inner side 323. The output fiber bundle housing has a plurality of sites 325 oriented in a spatial manner on the outer side for coupling to a plurality of output optical fibers. Each of the sites is capable of receiving at least one signal from one of the second mirrors.

The housing is made of a suitable material that is sufficiently rigid to provide a structural support. Additionally, each housing also has sufficient characteristics to house a fiber optic member. Furthermore, the material also has the ability to provide an array of fiber optic sites, which house fiber optic members. The material can include a conductor, an insulator, or a semiconductor, or any combination of these, as well as multilayered structures. The housing is preferably made of a similar material as the mirror array to cancel out any thermal expansion/contraction influences. Preferably, the material is silicon, but can also be other materials. Desirable, the material is also easy to machine and resists environmental influences. The housing also is capable of coupling to a lens and/or lens array, which will be described in more detail below.

The mirror can be any suitable mirror for adjusting a deflection of an optical signal(s). The mirror can be suspended on torsion bars, which adjust a spatial positioning of the mirrors. The torsion bars can be driven by electrostatic drive means, but can be others. As merely an example, U.S. Pat. No. 6,044,705 assigned to Xros, Inc., Sunnyvale, CA describes such a mirror in a specific manner. Alternatively, U.S. Pat. No. 4,317,611, assigned to International Business Machines Corporation, also describes such a mirror. It would be recognized by one of ordinary skill in the art that many other variations, alternatives, and modifications can exist.

Although the above has been described in terms of where the output arrays are split into a plurality of smaller arrays, the input arrays can also be split into a plurality of smaller arrays. Here, the output array would be a single piece larger array. Alternatively, each of the arrays can be split into a plurality of smaller sections or arrays. Each of these arrays can be of a similar size or a different size, depending upon the embodiment. The arrays can also be in a variety of shapes such as annular, trapezoidal, a combination of these, and others. These and other configurations would be recognized by one of ordinary skill in the art, where there can be many variations, modifications, and alternatives.

Figure 4A:
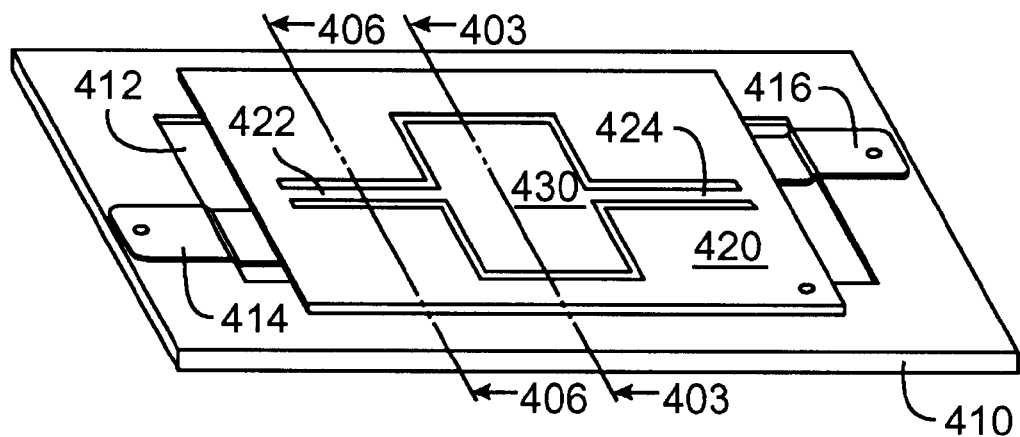
FIG. 4A to 4C are detailed diagram of a mirror assembly according to an embodiment of the present invention.
Figure 4B:
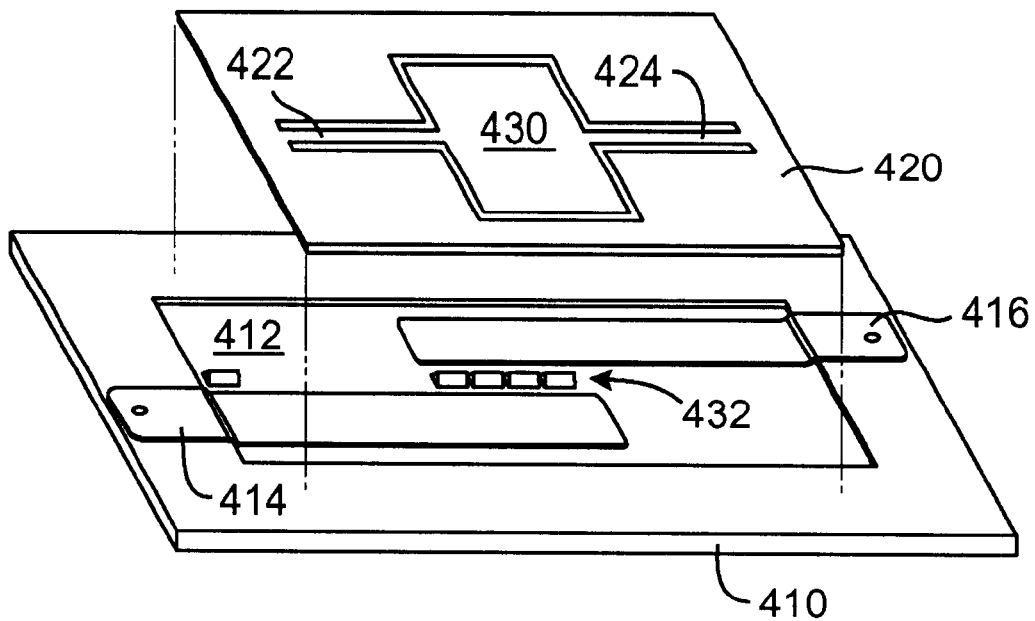

FIGS. 4A to 4B are detailed diagrams of a mirror assembly according to an embodiment of the present invention. This diagram is merely an example, which should not unduly limit the scope of the claims herein. One of ordinary skill in the art would recognizes many other variations, modifications, and alternatives. A view of an embodiment of a mirror assembly or optical ray deflection apparatus according to the invention as assembled is shown in FIG. 1. A substrate 410 of insulating material is partially etched away to form an annuloidal depression 412, later to be described in detail. A pair of conductive elements 414,416 are laid in the bottom of the depression 412. A plate member 420, preferably made of silicon, is etched completely through to leave a pair of torsion bar portions 422, 424 and a reflective armature portion 30 integrally formed by conventional photolithographical processes. Preferably, highly reflective material is deposited on the portion 430 for better light deflection. The material is chosen in accordance with the characteristics of the light whose rays are to be deflected. The silicon plate 420 is maintained at a neutral or ground reference potential and one of the conductive elements 414 or 416 is subjected to a relatively high potential which will effect rotation of the armature portion 430 about the longitudinal axis of the torsion bar portions 422, 424. Those skilled in the art will devise circuitry wherein the two conductive elements are excited differently about the neutral potential for greater effect.

Figure 4C:
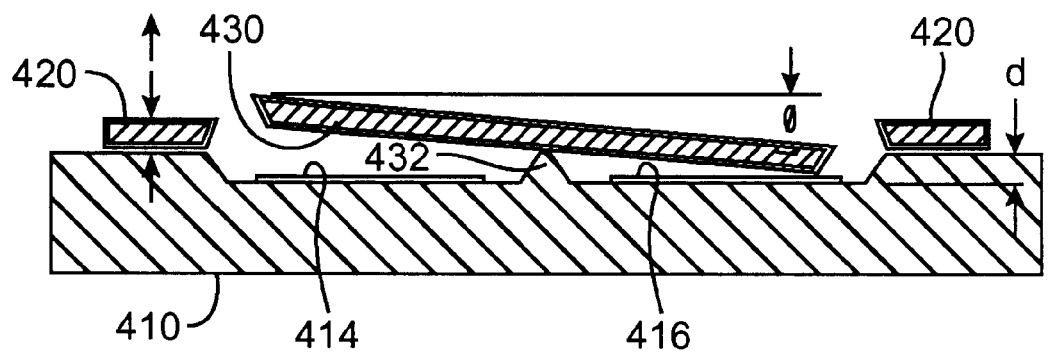

FIG. 4B is a view of the apparatus before assembly with the silicon plate 420 superimposed over the insulating plate 410, but spaced away to more clearly reveal the structure of the latter. The depression 412 is now more clearly seen to be of annuloidal form in that lands 432 have been left centrally of the perimeter of the depression 412. The term "annuloidal" as used herein is construed to indicate a moat-like volume of rectangular configuration that is analogous to a tubular configuration having an annular cross-section. A single land is operable, but the "ventilated" lands as shown are preferred in order that air may move more freely as it is "pumped" by the oscillation of the armature portion 430. The land 432 lies beneath the armature portion 430 and is aligned with the torsion bar portions 422, 424. The land 432 serves for confining the stress in the torsion bar portions to torsional moment with substantially little or no bending moment in the direction of the insulating plate 410. Also it can be seen that the conductive elements 414, 416 underlie a relatively large portion of the reflective portion 430 of the armature whereby relatively large electrostatic force may be applied. A cross-section view to the line 3—3 (FIG. 4A) is given in FIG. 4C. As shown, the silicon plate 420 is maintained at ground level while the conductive element 16 is maintained at a relatively high potential of the order of 100 volts effective to attract the armature and rotate it about the upper edge of the land 432 against the torsional moment to which the torsion bar portions (not shown in this figure) are subjected. The effect is enhanced if the other conductive element 414 is maintained at the opposite polarity potential effective to repulse the armature 430 at the same time as the first conductive element 416 is attracting it. The circuit diagram here is suggestive only; those skilled in the art readily will arrange switching circuitry effective for the purpose.

The semiconductor plate member 220 is preferably made of silicon but germanium and like materials are suitable alternates. The insulating plate member 410 is preferably made of silicon also, but other materials, notably glass, are entirely suitable. If both plate members are to be made of silicon the silicon dioxide coating used in the photolithographic etching process is left intact on at least one of the plate members and/or differential doping is in order for rendering a difference in characteristics of the plate members akin to the difference between conductive and insulating materials and the like. Further details of such optical deflecting apparatus is described in U.S. Pat. No. 4,317,705 assigned to International Business Machines Corporation, Armonk, N.Y., and in the name of Peterson.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

Figure 5:
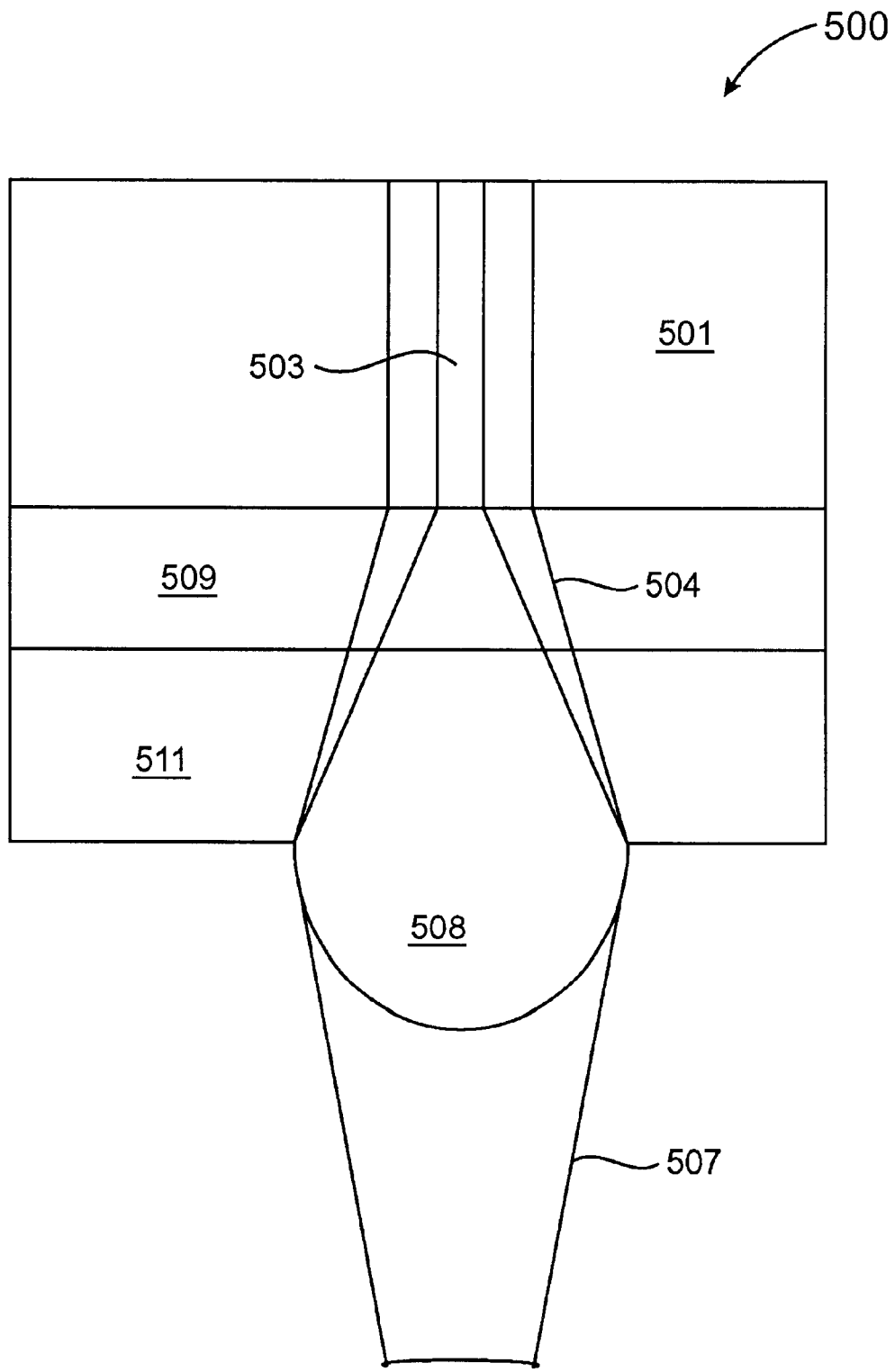
FIG. 5 is a detailed diagram of an optical coupling according to an embodiment of the present invention

FIG. 5 is a detailed diagram of a optical coupling 500 according to an embodiment of the present invention. This diagram is merely an example, which should not unduly limit the scope of the claims herein. One of ordinary skill in the art would recognizes many other variations, modifications, and alternatives. Here, a fiber bundle 501 including housing 509 is attached to a lens array 511. A plurality of fiber cores 503 are disposed in the housing. The lens array 511 can be fixed or variable. The lens array includes a plurality of lenses 506. Each of the lenses can compensate for any variation in direction by each of the fibers in the bundle. As shown, the light diverges 504 from an output of the core. The light traverses through the lens, which redirects 507 the light to an array of mirrors, for example. In some embodiments, there is only one signal per fiber. Alternatively, there can be multiple signals per fiber. The array of mirrors can be similar to the one noted as well as others.

Although the above has been described in terms of specific hardware features, it would be recognized that there can be many alternatives, variations, and modifications. For example, any of the above elements can be separated or combined. Alternatively, some of the elements can be implemented in software or a combination of hardware and software. Alternatively, the above elements can be further integrated in hardware or software or hardware and software or the like. It is also understood that the examples and embodiments described herein are for illustrative purposes only and that various modifications or changes in light thereof will be suggested to persons skilled in the art and are to be included within the spirit and purview of this application and scope of the appended claims.

In the present embodiment, each fiber carries a single optical signal. A modification thereof can include a plurality of multiplexed optical signals.

It is also understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

One of ordinary skill in the art would recognize many other variations, modifications, and alternatives. The above example is merely an illustration, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An apparatus for switching one of a plurality of optical signals from a plurality of optical fibers, the apparatus comprising:

an input fiber bundle housing comprising an outer side and an inner side, the input fiber bundle housing having a plurality of sites oriented in a spatial manner on the outer side for coupling to a plurality of input optical fibers, each of the input optical fibers being capable of transmitting an optical signal, a first mirror array disposed facing the inner side of the input fiber bundle housing, the first mirror array comprising a plurality of mirrors, each of the mirrors corresponding to one of the sites on the outer side of the input fiber bundle housing, each of the mirrors on the first mirror array being arranged to receive at least one optical signal from the input fiber bundle housing at an angle that is substantially normal to the first mirror array;

a second mirror array disposed facing the first mirror array, the second mirror array being disposed around a periphery of the input fiber bundle housing and being arranged in an annular configuration around the input fiber bundle, the second mirror array comprising a plurality of mirrors, each of the mirrors being capable of directing at least one signal from one of the mirrors on the first mirror array; and an output fiber bundle housing comprising an outer side and an inner side, the output fiber bundle housing having a plurality of sites oriented in a spatial manner on the outer side for coupling to a plurality of output optical fibers, each of the sites being capable of receiving at least one signal from one of the mirrors on the second mirror array, the output fiber bundle being disposed around a periphery of the first mirror array;

wherein the first mirror array and the second mirror array are arranged in a co-axial configuration to allow each of the mirrors to direct one or more signals to any one of the mirrors on the second mirror array.

2. The apparatus of claim 1 wherein the plurality of sites oriented in a spatial manner comprises an array.

3. The apparatus of claim 2 wherein the first mirror array is an 8 by 8 array of sites or greater.

4. The apparatus of claim 1 wherein the input fiber bundle housing is made of a material selected from a conductor, an insulator, or a semiconductor.

5. The apparatus of claim 1 wherein the output fiber bundle housing is made of a material selected from a conductor, an insulator, or a semiconductor.

6. The apparatus of claim 1 wherein the first mirror array comprises at least 32 by 32 mirror sites.

7. The apparatus of claim 1 wherein the second mirror array comprises at least four arrays of mirrors, each of the four arrays of mirrors having a rectangular shape, the rectangular shape housing an 2 by 8 array of mirrors or greater.

8. The apparatus of claim 1 wherein the first array of mirrors comprises a pitch of about 10 mm and less between each of the mirrors.

9. The apparatus of claim 1 wherein the second array of mirrors comprises a pitch of about 20 mm and less between each of the mirrors.

10. The apparatus of claim 1 wherein the first mirror array is at least 8 by 8.

11. The apparatus of claim 1 wherein each of the mirrors in the first mirror array comprises a plurality of torsion bars to adjust a spatial orientation of the mirror.

12. The apparatus of claim 1 wherein each of the mirror comprise a torsion bar means, the torsion bar means comprising electrostatic drive.

13. An apparatus for switching one of a plurality of optical signals from a plurality of optical fibers, the apparatus comprising:

a top side comprising a top fiber bundle housing and a top mirror housing being arranged in an annular configuration and being disposed around a periphery of the top fiber bundle housing;

a bottom side coupled to the top side and substantially facing the top side, the bottom side being substantially parallel to the top side, the bottom side comprising a bottom mirror housing and a bottom fiber bundle housing, the bottom fiber bundle housing being arranged in an annular configuration and being disposed around a periphery of the bottom mirror housing wherein the top side and the bottom side are arranged in a co-axial configuration.

14. The apparatus of claim 13 wherein the top mirror housing comprises a plurality of panels, wherein each panel is disposed in a sequential manner around the periphery of the top fiber bundle housing in a continuous manner.

15. The apparatus of claim 13 wherein the top mirror housing comprises at least one panel, the panel being of an annular shape to be disposed around the periphery of the top fiber bundle housing in a continuous manner.

16. The apparatus of claim 13 wherein the top fiber housing and bottom mirror housing are substantially parallel to each other and are characterized such that an optical beam from a fiber emitted from the top fiber housing is substantially normal to a respective mirror on the bottom mirror housing.

17. The apparatus of claim 13 wherein the top mirror housing and bottom fiber housing are substantially parallel to each other and are characterized such that an optical beam from a fiber emitted from the top mirror housing is substantially normal to a respective mirror on the bottom fiber housing.

18. The apparatus of claim 13 wherein the bottom mirror housing is coaxial with the bottom fiber housing.

19. The apparatus of claim 13 wherein the top mirror housing is coaxial with the top fiber housing.

20. The apparatus of claim 13 wherein bottom mirror housing is coaxial with the top mirror housing.

21. The apparatus of claim 13 wherein the top mirror housing, the top fiber housing, the bottom mirror housing, and the bottom fiber housing are each substantially coaxial with each other.

22. The apparatus of claim 21 wherein each of the housings is substantially symmetrical with each other.

23. The apparatus of claim 13 wherein the bottom mirror housing comprises a plurality of mirrors, each of the mirrors being able to deflect a beam up to 30 degrees from a position that is substantially parallel to the bottom mirror housing.

24. The apparatus of claim 13 wherein the bottom mirror housing comprises a plurality of mirrors in an array configuration, each of the mirrors being able to deflect a beam up to 30 degrees from a position that is substantially parallel to the bottom mirror housing.

25. The apparatus of claim 1 wherein input and output fiber bundles are reversed.

* * * * *